(No Model.)

J. E. JOHNSON.
GALLEY TYPE LOCK.

No. 304,432. Patented Sept. 2, 1884.

Witnesses:
T. C. Brecht
David T. Mead

Inventor:
John Edwin Johnson
By Wm. C. W. Intire
Attorney.

N. PETERS. Photo-Lithographer, Washington, D. C.

UNITED STATES PATENT OFFICE.

JOHN EDWIN JOHNSON, OF WASHINGTON, DISTRICT OF COLUMBIA, ASSIGNOR, BY MESNE ASSIGNMENTS, TO THOMAS A. MITCHELL.

GALLEY TYPE-LOCK.

SPECIFICATION forming part of Letters Patent No. 304,432, dated September 2, 1884.

Application filed December 12, 1883. (No model.)

*To all whom it may concern:*

Be it known that I, JOHN EDWIN JOHNSON, a citizen of the United States, residing at Washington, District of Columbia, have invented new and useful Improvements in Galley Type-Locks, of which the following is a specification.

My invention relates to certain new and useful improvements in galley type-locks, and particularly to that class in which the locking effect is produced by the expansive spring force of the lock.

My invention has for its object to produce a lock of the character stated economic of construction and successfully operative for the purpose for which it is designed; and with these ends in view my invention consists of a galley type-lock composed of two pieces of spring-wire, constructed and arranged relatively together in the manner and for the purposes hereinafter more fully described, and specifically claimed.

In order that those skilled in the art may know how to make and use my improvement, I will describe its construction and operation, referring by letters to the accompanying drawings, in which—

Figure 1:
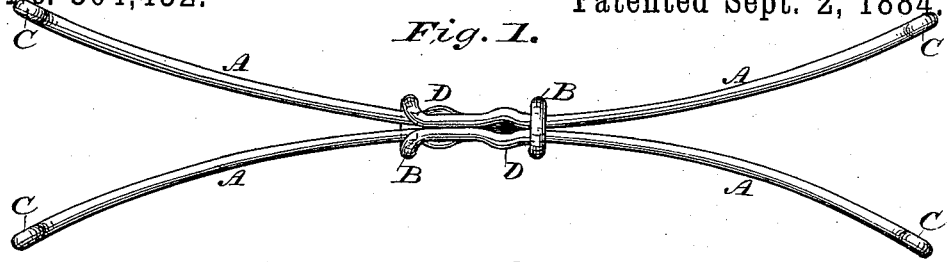
Figure 2:
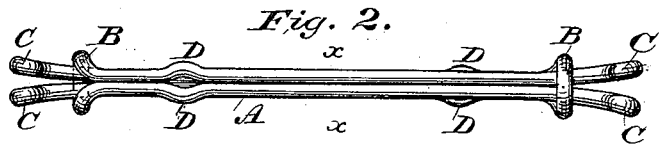
Figure 3:
Figure 4:
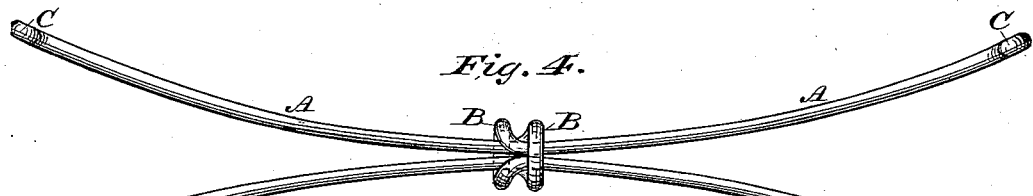
Figure 5:
Figure 6:
Figure 7:
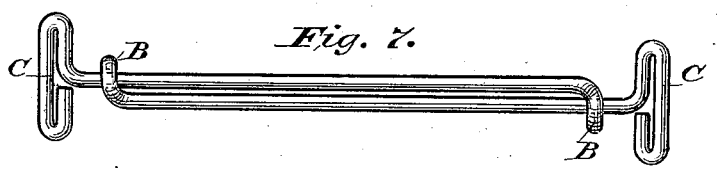

Figure 1 is a plan view of one of my improved galley type-locks with the spring ends distended. Fig. 2 is a similar view with the ends confined to their narrowest limits by being forced or drawn within the compressing-eyes of the respective sections composing the type-lock. Fig. 3 is a side view of the same when in the position seen at Fig. 2. Fig. 4 is a view similar to Fig. 1, but without the stops for limiting the outward extension, as shown at Fig. 1. Fig. 5 is a cross-section at *x x* of Fig. 2, illustrating the contour of the wires at points of contact to produce a sufficient bearing. Fig. 6 is a plan view of the form shown at Fig. 4, but having the ends drawn together; and Fig. 7, a side elevation of the same.

Similar letters denote like parts in the several figures.

A A represent two pieces of spring-wire of a gage sufficiently large to produce the necessary amount of spring-pressure. These wires are bent in a curved line outwardly, so that when in operative position they will assume the curved direction indicated at Figs. 1 and 4. The central portions of these sections A are bent up at right angles to form an eye, B, just large enough to permit the passage in and through each of the two arms of the other section, as clearly shown in the drawings, and, while permitting this entrance and movement, to act as a compressor to draw and hold together the curved arms, as clearly shown at Figs. 2, 3, 6, and 7. After the curved arms of each section have been passed through the eye B of the other the extreme ends of both sections are bent into the form shown at C, to form "tips," and at the same time prevent separation or disjoinder of the two sections. It will be seen that the tipped ends of the spring-sections are caused to approach each other, as seen at Figs. 2, 3, &c., or to expand, as seen at Figs. 1 and 4, proportionately as the sections are forced toward or away from each other, as clearly shown.

At Figs. 1, 2, and 3 I have shown a means for limiting outward longitudinal movement of the sections, which consists in crimping or bulging the wire, as seen at D, after they have been passed through the eyes B in assembling the parts, so that the cross-section at such points is greater in diameter than the eyes B, and hence the portions D serve as stops when they come in contact with the eyes. While I prefer to provide the lock with these stops, they are not absolutely necessary, as I have shown at Figs. 4, 5, and 6 the locks without them. When the stops are omitted, I depend upon the contact of the eyes B B as stops to limit the longitudinal movement of the two sections.

What I claim as new, and desire to secure by Letters Patent, is—

1. A galley type-lock composed of two sections of spring-wire, each folded centrally upon itself and formed with a transverse eye, B, the arms of each section being passed through the eye B of the other, bent outwardly to form curved springs, and doubled upon themselves at their extreme ends, to form tips C, substantially as and for the purposes set forth.

2. In a galley type-lock, the two spring-sections A, formed with eyes B, and arranged to interlock as described, each section being formed or provided with bulges or stops D, adapted to come in contact with the eyes B, to limit the longitudinal movement of the sections, substantially as shown and described.

In testimony whereof I have hereunto set my hand in the presence of two subscribing witnesses.

JOHN EDWIN JOHNSON.

Witnesses:
 DAVID H. MEAD,
 WILLIAM PAXTON.